United States Patent [19]

Foster et al.

[11] Patent Number: 5,534,575
[45] Date of Patent: Jul. 9, 1996

[54] HOT MELT ADHESIVE COMPOSITION

[75] Inventors: Mary E. Foster, Vadnais Heights; Eugene R. Simmons, Maplewood; Lowell G. Lindquist, St. Paul; William L. Bunnelle, Hugo, all of Minn.

[73] Assignee: H. B. Fuller Licensing & Financing, Inc., Wilmington, Del.

[21] Appl. No.: 380,215

[22] Filed: Jan. 30, 1995

Related U.S. Application Data

[63] Continuation of Ser. No. 907,678, Jul. 2, 1992, abandoned.

[51] Int. Cl.$^6$ .............................. C08K 5/10; C08K 5/09; B23B 7/12; B23B 15/04

[52] U.S. Cl. .................. 524/270; 524/505; 524/507; 524/513; 524/502; 524/606; 524/271; 524/292; 428/355

[58] Field of Search ..................... 524/271, 606, 524/502, 507, 513, 505, 292, 270; 428/355

[56] References Cited

U.S. PATENT DOCUMENTS

| | | | |
|---|---|---|---|
| 3,932,328 | 1/1976 | Korpman | 524/271 |
| 4,028,292 | 6/1977 | Korpman | 260/27 R |
| 4,359,551 | 11/1982 | Suda et al. | 524/271 |
| 4,622,357 | 11/1986 | Tsuchida et al. | 524/270 |
| 4,745,026 | 5/1988 | Tsukahra et al. | 428/323 |
| 4,767,813 | 8/1988 | Evitt | 524/271 |
| 4,978,709 | 12/1990 | Taniguchi et al. | 524/606 |
| 5,026,752 | 1/1991 | Wakabayashi et al. | 524/271 |
| 5,143,961 | 9/1992 | Scholl et al. | 524/221 |

FOREIGN PATENT DOCUMENTS

| | | |
|---|---|---|
| 0261669 | 9/1987 | European Pat. Off. . |
| 1507821 | 2/1977 | United Kingdom . |
| WO87/02621 | 10/1986 | WIPO . |
| WO91/15530 | 3/1991 | WIPO . |

OTHER PUBLICATIONS

Letter from DuPont Polymers dated Apr. 20, 1992.
Lucas, et al, Adhesives Age, Feb., 1992, pp. 28–31.
R. B. Koch, "Pebax (Polyether Block Amide)", *Advances in Polymer Technology*, vol. 2, No. 3, pp. 160–162, 1982.
"Properties and uses of Dyvax® Resin", Dupont Product Brochure, pp. 1–7, undated.
William J. Farrissey et al, "Chapter 8 Polyamide Thermoplastic Elastomers", *Handbook of Thermoplastic Elastomers Second Edition*, Edited by Benjamin M. Walker et al., Van Nostrand Reinhold Company, pp. 258–281., date unknown.
Japanese Abstract for Bonding Of Pad To Automobile Carpet, by Okuyama Toshio et al.
"Pebax® 3533 SA 00", 5 pages of product brochure, Atochem, undated.

*Primary Examiner*—Paul R. Michl
*Assistant Examiner*—LaVonda R. DeWitt
*Attorney, Agent, or Firm*—Vidas, Arrett, & Steinkraus

[57] ABSTRACT

Hot melt adhesives which include at least 5% of a thermoplastic elastomer block copolymer having a Vicat softening temperature of at least 60° C. and a melting point of at least 100° C., have improved thermal resistance properties and can be applied with conventional hot melt application equipment at temperatures of between about 149° C. and about 204° C. The adhesives are particularly suited to use in above-the-belt locations in automobile interiors and in furniture bonding. Especially suitable thermoplastic elastomers are polyether-polyester and polyether-polyamide segmented polymers with melting points above 149° C. Hot melt adhesives based on these thermoplastic elastomers can be formulated to provide a range of properties including pressure sensitive properties and contact adhesive properties.

26 Claims, No Drawings

HOT MELT ADHESIVE COMPOSITION

This is a continuation of application Ser. No. 07/907,678 filed on Jul. 2, 1992 now abandoned.

FIELD OF THE INVENTION

This invention relates to the field of hot melt adhesives and in particular to hot melt adhesives useful in conventional application machinery having a maximum melt temperature in the range of about 177° C. (350° F.) to 204° C. (400° F).

BACKGROUND OF THE INVENTION

Recently, the uses for hot melt adhesives have been undergoing rapid expansion as pressures to eliminate solvent based adhesives for health, safety and environmental reasons increase throughout industry. This, in turn, has led to investigations of systems offering new properties which allow hot melts to be more widely used. Pressure sensitive hot melts, such as described in U.S. Pat. No. 4,622,357, and hot melts displaying extended open times of several minutes to as long as several hours, such as described in copending applications Ser. Nos. 07/385,515, filed Jul. 25, 1989 and 07/213,789, filed Jun. 30, 1988, assigned to the same Assignee hereof and incorporated herein by reference, are examples of the novel systems currently being developed.

A significant limitation of hot melt adhesives, however, is their limited heat resistance. Formulations which are readily flowable at 177°–204° C. (350°–400° F.), the typical operating temperatures of conventional application machinery, will soften and lose bonding strength at much lower temperatures. Hot melt adhesives are known which give relatively good heat resistance such as polyamides, polyesters, and reactive systems but they have other undesirable properties. Polyamide based hot melts, for instance, that give good thermal resistance usually have very poor ambient and low temperature flexibility and short open times.

There, therefore, exists a need for new hot melt formulations which display better high temperature resistance without sacrificing low temperature properties and open times. Such adhesive formulations should be non-reactive and be widely variable in composition so that those skilled in the art can exhibit the high temperature resistance in compositions displaying other desired properties, such as permanent pressure sensitive properties, extended open time, flexibility, better solvent, or plasticizer resistance, etc.

SUMMARY OF THE INVENTION

The present invention is based on the discovery that certain thermoplastic elastomers previously used as engineering or injection molding resins can be easily formulated into hot melt adhesives of widely varying properties which give improved high temperature resistance, but can still be applied with conventional application equipment. Typical hot melt adhesives having conventional application temperatures in the range of about 177° C. (350° F.) to 204° C. (400° F.), have shear adhesion failure temperatures (SAFT), as defined herein, of 71°–82° C. (160°–180° F.). By contrast, adhesives of the invention can readily be formulated with SAFTs of greater than 100° C. (212° F.), typically 116°–127° C. (240°–260° F.). This is a significant improvement, allowing the adhesives of the invention to be used in applications such as the bonding of automobile head liners and carpeting.

In one aspect, the invention comprises a hot melt adhesive which includes at least 5% of a thermoplastic elastomer block or segmented copolymer having a Vicat softening temperature of at least 60° C. and a melting temperature of at least 100° C., more preferably greater than 140° C.

In a further aspect, the invention may be characterized as a hot melt adhesive having a SAFT after 72 hours of at least 100° C. (212° F.), said adhesive comprising between about 10 and about 50% of a segmented thermoplastic copolymer, suitably comprising soft segments of polyether and hard segments of polyester or polyamide, the copolymer having a melting point of at least 100° C. (212° F.), preferably greater than 140° C. (284° F.).

DETAILED DESCRIPTION OF THE INVENTION

The Thermoplastic Polymer Base

The thermoplastic elastomers useful in the invention are "engineered" block copolymers having high softening and melting temperatures. The blocks may be few in number and relatively large but more typically are segmented copolymers comprising multiple relatively small blocks. The Vicat softening temperatures of the copolymers are at least 60° C., preferably at least 80° C., with melting temperatures typically in the range of 100°–220° C., preferably 140°–190° C. Particularily prefered are polyether-polyester and polyether-polyamide segmented copolymers in which the polyether segments of the copolymers are soft segments, typically of 500–3000 molecular weight and the polyester or polyamide segments are relatively shorter hard segments, typically of 200–750 molecular weight. Example resins include polyether-polyester block copolymers sold under the Hytrel® trademark by DuPont and the Lomod® trademark by General Electric and polyether block polyamide copolymers sold under the PEBAX® trademark by Atochem North America. They have high tensile strength which contributes to the good adhesive properties of the inventive formulations even at low concentrations of the base polymer. A preferred polymer is Hytrel® 8122 which has a tensile stress at break of 26.2 MPa (ASTM D638), a Vicat softening point of 83° C. (ASTM D1525) and a melting point of 170° C. (ASTM D3418).

Other thermoplastic elastomeric block copolymers satisfying the temperature property requirements of the invention may also be used in some applications of the invention. For instance, polyamide/polyester resins of the type sold under the Estamid trademark by Upjohn. Various thermoplastic polyurethane elastomers may also be used in the formulations of the invention, although formulation into suitable hot melt adhesives may be more difficult with some because of their high modulus. The thermoplastic polyurethane elastomers are segmented polymers having polyurethane or polyurea hard segments and polyether, polyester or polycaprolactone soft segments. The hard segments comprise a number of diisocyanate monomers extended with short chain diols or diamines. Typically the hard segments, which vary in crystallinity, have a molecular weight of between 200 and 700. The soft segments are typically derived from hydroxy or amine terminated polymers that range in molecular weight between 500 and 3000. The overall ratio of hard segment to soft segment is typically between 1:5 and 3:2. Generally polyether soft segments are preferred. Examples of thermoplastic polyurethane elastomers include polymers sold under the trademarks Estane (BF Goodrich), Roylar (Uniroyal), Texin (Mobay), Pellethane (Upjohn), Rucothane (Hooker), and Plastothane (Thiokol).

The amount of base polymer employed in the formulation will vary depending on the adhesive and thermal properties desired to be obtained. In general, improvement in thermal resistance of the formulation may be seen at levels as low as 10%. Levels of 25%–40% are generally preferred. As the level of the adhesive polymer increases the thermal resistance properties of the adhesive increases but formulation to achieve satisfactory flow in the desired temperature range of 177°–204° C. becomes more difficult. A practical upper limit is about 50%.

In combination with these polymers, other copolymers and terpolymers can be used to give the hot melt adhesive known properties. Examples of other polymers used in conjunction with the above-mentioned polymers are high vinyl acetate EVA's (ethylene vinyl acetate) such as the Vynathene® series by USI and Elvax® 46L by Dupont, EMA's (ethylene methyl acrylate) such as the Optema® series by Exxon, EnBA's (ethylene-n-butyl acrylate copolymer) such as the Enathene® 89822 by USI, EnBACO's (ethylene-n-butyl acrylate carbon monoxide terpolymer) such as Elvaloy® series by Dupont, and functional waxes such as A-C® (oxidized high density polyethylene) sold by Allied-Signal.

Tackifier

The adhesives of the invention also contain a tackifying resin in combination with the thermoplastic elastomer. The tackifying resins are suitably employed at levels of between about 5 and 70%, preferably between 20 and 50%, of the total weight of the hot melt formulation. Tackifying resins useful in the adhesives of the invention may be rosin derivatives (including wood rosin, tall oil, tall oil derivatives, rosin ester rosins, etc.), aliphatic resins such as natural and synthetic terpenes and aromatic or mixed aromatic-aliphatic tackifying resins.

Representative examples of rosin include gum rosin, wood rosin, and tall oil rosin. Representative examples of rosin derivative tackifying resins include the pentaerythritol esters of tall oil, gum rosin, wood rosin and mixtures thereof.

Representative examples of aliphatic tackifying resins include natural terpene resins, hydrogenated synthetic $C_9$ resins, hydrogenated synthetic resins, synthetic branched and unbranched $C_5$ resins, and mixtures thereof.

Aromatic monomers useful in forming the aromatic and aliphatic-aromatic adhesive compositions of the invention can be prepared from any monomer containing substantial aromatic qualities and a polymerizable unsaturated group. Typical examples of such aromatic monomers include the styrenic monomers styrene, α-methylstyrene, vinyl toluene, methoxystyrene, t-butylstyrene, chlorostyrene, etc., and indene monomers including indene, methyl indene, and others.

Aliphatic monomers are typically natural and synthetic terpenes which contain $C_5$ and $C_6$ cyclohexyl or cyclopentyl saturated groups that can additionally contain a variety of substantially aliphatic ring substituents. Aliphatic tackifying resins can be made by polymerizing a feed stream containing sufficient aliphatic monomer such that the resulting resin exhibits aliphatic characteristics. Such feed streams can contain other aliphatic unsaturated monomers such as 1,3-butadiene, cis-1,3-pentadiene, trans-1,3-pentadiene, 2-methyl-1,3-butadiene, 2-methyl-2-butene, cyclopentadiene, dicyclopentadiene, terpene monomers, and others. Mixed aliphatic-aromatic resins contain sufficient aromatic monomers and sufficient aliphatic monomers and optionally other $C_3$–$C_8$ unsaturated monomers to produce a resin having both aliphatic and aromatic character.

Representative examples of aromatic-aliphatic tackifying resins include styrenated terpene resins, styrenated $C_5$ resins, or mixtures thereof.

Terpene-phenolic resins are also useful tackifying resins, particularly where "contact adhesive" properties are desired. Such properties are characterized by an extended pressure sensitive open time during which cohesive strength is very low so that the substrates to which the adhesive is applied can readily be repositioned, followed by rapid development of final adhesive properties, including good cohesive strength and good high temperature resistance. The terpene-phenolic resins also contribute to hot tack of the formulations in the molten state. Such resins include Nirez® V-2040, sold by Arizona Chemical and Piccofyn® T-125 sold by Hercules. They may be usefully employed at levels up to about 30% of the formulation and will typically be employed as only part of the total tackfying resin content of the formulation.

Specific examples of other tackifying resins which may be employed in the formulations of the invention include Sylvatac® 295 and Sylvatac® 85 rosin acids (Arizona Chemical Co.) and the rosin esters Permalyn® 305, Permalyn® 1084, and Polypale® Ester 10 (Hercules), Sylvatac® 1103, Sylvatac® 105, Zonester® 100, and Sylvatac® 1085 (Arizona Chemical Co.) and Unitac® R-100 Lite (Union Camp). Examples of terpenes and $C_5$ resins include Zonatac® 105 and Zonatac® 501 (Arizona Chemical) and Wingtac® 10 (Goodyear). In the category of styrene and related resins there is included, for example, Kristalex® 3070, 3085, 3100 and 5140 (Hercules) and in the category of ketoneformaldehyde resins there is Synthetic Resin™ AP (Huels America). Arkon® M-90 (Arakawa Chemical) and Regalarez® 1094 (Hercules) are examples of cycloaliphatic resins useful in the inventive formulations while Cumar LX®-509 (Neville) is an example of a suitable $C_9$ coumarone-indene resin.

Plasticizer

The formulations of the invention will typically also include a conventional plasticizer compound, although in some formulations the tackifier resin will impart sufficient plasticization to provide acceptable properties without addition of a separate plasticizer. The plasticizer used in the adhesives of the invention may be liquid or solid, depending on properties sought. Solid plasticizers with increased softening points of (60°–130° C.) can aid in improving heat resistance or preventing bond failure at high temperatures. The plasticizer may be employed at levels up to about 60%, typically between about 10 and 40%, preferably 20–30%.

One useful class of plasticizers used in the invention comprises a cycloaliphatic or aromatic ester of a benzene dicarboxylic acid. Such plasticizers are prepared by forming an ester from an aliphatic or aromatic alcohol, or mixtures of such alcohols, such as 2-ethylhexanol, cyclohexanol, phenol, naphthol, or other monohydroxy alcohol compounds having from 5 to 12 carbon atoms. The ester compounds are formed from dicarboxylic acid compounds, typically phthalic acids. Phthalic acids that can be used in the plasticizers are 1,2-benzene dicarboxylic acid, 1,3-benzene dicarboxylic acid (isophthalic acid), or 1,4-benzene dicarboxylic acid (terephthalic acid). Such plasticizers of this class include dioctyl phthalate, butyl benzyl phthalate dicyclohexyl phthalate and diphenyl phthalate.

A second class of useful plasticizers comprise an aromatic carboxylic acid ester of a polyfunctional alcohol having 2 to 10 hydroxyl groups. Polyfunctional alcohols that can be used in the compositions of this class of plasticizers include compounds having at least two hydroxyl groups and at least two carbon atoms in the molecule. Specific examples of preferred hydroxy compounds include ethylene glycol, propylene glycol, 1,2-butylene glycol, 1,4-butylene glycol, glycerine, glucose, fructose, sucrose, mannitol, trimethylolethane, 1,4-cyclohexanedimethanol, pentaerythritol, 2,2-dimethyl-1,3-propanediol, 2-hydroxymethyl-2-methyl-1,3-propanediol, neopentyl glycol, and other useful polyfunctional hydroxyl compounds. Aromatic acids that can be used with the polyfunctional alcohols to form this class of ester plasticizer compounds include aromatic carboxylic acids, typically having at least one aromatic group and at least one carboxyl function. Representative acids include benzoic acid, naphthionic acid, and 4-methyl benzoic acid. Typical examples of such useful plasticizers include ethylene glycol dibenzoate, propylene glycol dibenzoate, trimethylene glycol tribenzoate, trimethylol ethane tribenzoate, glycerol tribenzoate, sucrose benzoate, pentaerythritol tetrabenzoate, 2,2-dimethyl-1,3-propanediol dibenzoate, trimethylene glycol dibenzoate, glycerol tribenzoate, 2-hydroxymethyl-2-methyl-1,3 -propanedioltribenzoatepentaerythritoltetrabenzoate, neopentyl glycol dibenzoate, mixtures thereof, and others. A preferred plasticizer is a solid with a softening point above 60° C. which belongs to the class of plasticizers including cyclohexane dimethanol dibenzoate compounds. A 1,4-cyclohexane dimethanol dibenzoate (containing cis- and trans- isomers) is exemplified and produces the maximum control over variation and change in adhesive physical properties.

A third class of useful plasticizers for use in the invention comprise a sulfonamide class made from aromatic sulfonic acids. Such plasticizers generally fall within the structural formula:

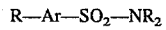

R—Ar—SO$_2$—NR$_2$ wherein each R is independently selected from the group consisting of hydrogen, aliphatic and cycloaliphatic radicals having 1 to 12 carbon atoms. Each R can be typically hydrogen, methyl, ethyl, propyl, isopropyl, n-butyl, isobutyl, tertiary butyl, ethylhexyl, neopentyl, cyclohexyl, dodecyl, etc. R is preferably methyl, ethyl or cyclohexyl. Such sulfonamide plasticizers can also be used in the form of a resinous material formed through the condensation of formaldehyde with said sulfonamide plasticizer.

Other ingredients

The formulations of the invention may also include other ingredients conventionally employed in hot melt adhesive formulations. For instance they will typically also employ an antioxidant to stabilize the melted adhesive. Suitable antioxidants include butylated hydroxy toluene, hindered phenolic antioxidants such as Irganoz® 1076 and Irganox® 1010 (sold by Ciba-Geigy), secondary amine antioxidants such as Naugard® 445 (Uniroyal), Vanox® (RT Vanderbilt) and Octamine® (Uniroyal), phosphite stabilizers such as Weston® 619 (Borg-Warner), optical brighteners such as Uvitex® OB (Ciba-Geigy) and UV stabilizers such as Tinuvin® (Ciba-Geigy). The antioxidants are typically employed at levels of about 0.1–5%, preferably 0.5–2% by weight of the formulation. A preferred antioxidant is a mixture of approximately equal parts by weight of a hindered phenolic antioxidant, (Irganoz® 1076 or Irganox® 1010) and a secondary amine antioxidant (Naugard® 445).

Hot Melt Contact Adhesive

Traditional contact adhesives have been described as formulations which, when applied to a surface as a solvent solution or latex and then dried until a film is formed, have almost no adhesion to other substrates. During the consecutive "open time" crystallization of the polymer is retarded by residual solvent and the resin used. Intimate contact during this open time on a molecular level by exerting pressure (and sometimes applying heat as well) to another coated surface results in a bond with high initial strength. The polymer is able to diffuse across the adhesive-adhesive interface so that after a period of time, the boundary of the adhesive film is lost.

In a preferred embodiment of the invention, hot-melt contact cements are formulated, characterized by an open time after application from melt, during which adhesion is generated by pressure contact and a subsequent set. Crystallization of other compounds, in addition to the base polymer, may contribute to the adhesive set.

Formulations within the following ranges display "hot melt contact adhesive" properties as defined above.

| | |
|---|---|
| 25–40% | Polyether-polyester thermoplastic elastomer |
| 20–30% | Plasticizer |
| 10–40% | Low MW hydrocarbon tackifier |
| 0–30% | Terpene-phenolic tackifier |
| 0.5–2% | Antioxidant |

Uses

The hot melt adhesives of the invention may be used in any general bonding applications. They are particularly useful, however, in high volume production bonding applications where the bonded substrates may become intermittently subjected to elevated temperatures in the range of between about 57° C. (135° F.) and 88° C. (190° F.). Such temperatures are frequently encountered, for instance, in above-the-belt locations in automobile interiors and in the interiors of boxcars and truck trailers..

Heretofore, hot melt adhesives have not been usable in above-the-belt line location of automobile interiors. The adhesives of the invention allow the use of hot melts in such locations. An example of such application is the bonding of headliner material to the interior roof of an automobile, suitably by spray application of the molten adhesive.

Because of conditions encountered in shipping furniture, adhesives used, for instance to bond plastic laminates to particle board, to bond foam to wood or metal backing and to bond cloth covering materials to foam or backing materials, must also frequently be capable of enduring temperatures above 57° C. In foam bonding applications, mold releases and other materials in the foam can also contribute to adhesive debonding, particularly at high temperatures. The adhesives of the invention are adaptable to rapid automated application and provide good temperature resistance and solvent resistance properties which make them especially suitable for use in furniture bonding applications.

The invention is illustrated by the following non-limiting examples.

EXAMPLES

In the following examples premix formulations of thermoplastic elastomer and tackifier resins were used as set forth in table I.

TABLE I

| Formulation | PREMIX | | |
|---|---|---|---|
| | A | B | C |
| Hytrel ® 8122 | 66% | 66% | 60% |
| Kristalex ® 3100 | 33% | — | 25% |
| Kristalex ® 3085 | — | 33% | — |

TABLE I-continued

| | PREMIX | | |
|---|---|---|---|
| Formulation | A | B | C |
| Nirez ® V-2040 | — | — | 14% |
| Antioxidant | 1% | 1% | 1% |

Premixes were prepared in a twin screw melt extruder having a length to diameter ratio of 40:1. The mixed resins were fed at a rate adjusted to keep residence time to about 2 minutes or less. The melt was heated to a maximum temperature of 177° C. (350° F.) within the extruder. The cooled extruded premix was pelletized for use in subsequent formulations.

EXAMPLES 1–2

Formulations were prepared as set forth in Table II.

TABLE II

| | EXAMPLE | |
|---|---|---|
| Formulation | 1 | 2 |
| Premix A | 50 | 50 |
| Kristalex 3100 | 29.5 | 29.5 |
| Benzoflex 352 | 20 | — |
| Benzoflex 9-88 | — | 20 |
| Santicizer 160 | — | — |
| Antioxidant | 0.5 | 0.5 |

The formulations were prepared by heating the premix and antioxidant to 204° C. (400° F.) in an oven, blending the resin in an upright mixer until a smooth and consistent melt was obtained, adding the plasticizer with mixing and then cooling as soon as a uniform blend of all components was obtained. The Benzoflex 352 plasticizer was a solid, but at the temperature of the mix, the solid melted almost instantaneously. The remaining plasticizers are liquids at ambient.

The open time behavior of the formulations were demonstrated by remelting the respective formulations in a 177° C. (350° F.) oven, applying the melt to Kraft paper at a 10 mil (0.25 mm) film with a draw bar and reheating the coated paper to 177° C. (350° F.) in an oven. On removal from the oven thin strips of uncoated Kraft paper were applied successively to available portions of the film at 1 minute intervals until the paper would no longer stick to the coated paper. Open times of 7 and 9 minutes were provided by the formulations of Examples 1 and 2, respectively.

Melt viscosities of the formulations of examples 1 and 2 at 177° C. (350° F.) and 204° C. (400° F.) are listed in Table III.

Peel adhesion failure temperature (PAFT) and shear adhesion failure temperatures (SAFT) were determined by bonding overlaid Kraft paper strips 10.16×2.54 cm over a central 2.54×2.54 cm bond area (10 mil adhesive thickness). Each strip therefore had an unbonded "tail" above and below the bond area. After allowing the adhesive to cool and conditioning at room temperature for 16 hours, the laminates were suspended from a tail of one of the bonded strips in a programmable oven. A weight was attached to the other strip on the corresponding tail which would produce either a peel mode or a shear mode stress on the adhesive bond. A 100 gm weight was used for peel mode samples. A 500 gm weight was used for shear mode samples. Starting at 25° C., the oven was heated at a rate of 25° C./hour. The temperature at which the peel mode samples delaminated and the weight fell was recorded as the PAFT temperature. The temperature at which the shear mode samples delaminated and the weight fell was recorded as the SAFT temperature. Results, listed in Table III, are averages of three samples for each test.

TABLE III

| | EXAMPLE | |
|---|---|---|
| Properties | 1 | 2 |
| Viscosity (cps) 177° C. (350° F.) | 17800 | 9613 |
| Viscosity (cps) 204° C. (400° F.) | 7925 | 4485 |
| 30 min. PAFT | | |
| (°C.) | 76 ± 7 | 61 ± 3 |
| (°F.) | 168 ± 13 | 141 ± 5 |
| 72 hr. PAFT | | |
| (°C.) | 92 ± 6 | 65 ± 8 |
| (°F.) | 199 ± 11 | 149 ± 15 |
| 30 min. SAFT | | |
| (°C.) | 134 ± 3 | 130 ± 3 |
| (°F.) | 274 ± 5 | 266 ± 5 |
| 72 hr. SAFT | | |
| (°C.) | 141 ± 1 | 128 ± 14 |
| (°F.) | 285 ± 2 | 262 ± 26 |

The results illustrate a level of high temperature resistance which has only previously been available from polyamide hot melt formulations which have no open time, have very poor flexibility and require much higher processing temperatures. The similarity of the 30-minute and 72-hour PAFT and SAFT results also demonstrate the rapid development of substantially final adhesive properties once the open time has elapsed.

EXAMPLES 3–7

Hot melt compositions which have permanent pressure sensitive properties after application and cooling were prepared as set forth in Table IV, using techniques substantially as described for Examples 1–3. The compositions display vinyl plasticizer resistance comparable to solvent based crosslinked acrylic pressure sensitive adhesives and generally better solvent resistance.

TABLE IV

| | EXAMPLE | | | | |
|---|---|---|---|---|---|
| Ingredients | 3 | 4 | 5 | 6 | 7 |
| Premix B | 30 | 25 | — | — | — |
| Premix C | — | — | 25 | 30 | 40 |
| Plasticizer | 25 | 25 | — | 27.5 | 25 |
| Rosin ester tackifier (85° C. mp) | 44 | — | 24 | — | — |
| Unitac ™ R100 Rosin ester Tackifier | — | 36.5 | — | — | 32 |
| Evaloy EP-4043 | — | — | 10 | — | — |
| Kristalex 3070 | — | — | — | 29.5 | — |
| Polyethylene (A-C 395) | — | 2.5 | — | 2.5 | 2.5 |
| Liquid rosin ester (Sylvatac 5N) | — | 10 | 40 | — | — |
| Liquid styrenated resin (A5, Hercules) | — | — | — | 10 | — |
| Antioxidant | 1 | 1 | 1 | 0.5 | 0.5 |

EXAMPLE 8

The solvent resistance properties of the formulation of Example 7 was compared to a number of typical commercial hot melt formulations. The test consisted of pre-weighing a 4–6 gm piece of hot melt and then placing the hot melt piece in 100 ml of solvent (with the exception of dioctyl phthalate where only 50 ml was used). The samples were left soaking at room temperature for 16 hours. After 16 hours, visual observations were noted and the samples were post-weighed to determine if any solvent was absorbed. Results are given in Table V.

TABLE V

| | HOT MELT FORMULATION | | | | |
|---|---|---|---|---|---|
| Solvent | Example 8 | Polyamide | High Heat Resistant PSA | Packaging Hot Melt | Book Binding Hot Melt |
| Water | OK | OK | OK | OK | OK but yellowed |
| MEK | Peeled | Peeled and 85% wt increase | Dissolved | OK | Partially dissolved |
| DOP | OK | OK | Softened but no wt gain | OK | Softened |
| Toluene | Peeled | Partially dissolved | Dissolved | Didn't dissolve but 18% wt increase | Dissolved |
| Hexane | OK | Didn't dissolve but 23% wt increase | Dissolved | Softened with 5% wt increase | Broke up into chunks |
| IPA | OK | Partially dissolved | OK | OK | OK |
| 1,1,1-Trichloroethane | Partially dissolved | Mostly dissolved | Dissolved | Softened with 61% wt increase | Dissolved |

As can be seen from the Table, the only adhesive which gave better solvent resistance was the packaging hot melt and that formulation had a very short open time due to a high wax content.

EXAMPLE 9

A hot melt contact adhesive formulation was prepared by melting 46% Premix A, 1% Irganox® 1010, and 1% Naugard® 445 in a 400° F. oven for 5 hours. The mixture was then placed in an upright mixer while adding 27% Nirez® V-2040. When the mixture was smooth, 25% Benzoflex® S-352 was mixed in. This formulation, when swirl sprayed using a 0.018 inch orifice to bond a plywood chair seat form to an open cell polyurethane foam pad, without 100% adhesive coverage, gave no delamination when the bonded assembly was held in a 71° C. (160° F.) oven for 96 hours.

EXAMPLE 10

Hot-melt formulations having pressure sensitive properties were prepared as follows:

| | 10-A | 10-B |
|---|---|---|
| Premix A | 25.0 | 20 |
| Sylvatac 5N | 40.0 | 39 |
| Sylvatac 1085 | 24.0 | 20 |
| Elvaloy EP-4043 | 10.0 | 20 |
| Irganox 1010 | 1.0 | 0.5 |
| Naugard 445 | — | 0.5 |
| | 100.0 | 100.0 |

EXAMPLE 11

A hot melt contact adhesive formulation was prepared as follows:

| | |
|---|---|
| Pebax 2533 | 34.0 |
| Kristalex 3100 | 9.0 |
| Nirez V-2040 | 25.0 |
| Benzoflex S-352 | 30.0 |
| Irganox 1010 | 1.0 |
| Naugard 445 | 1.0 |
| | 100.0 |

The adhesive had a viscosity at 149° C. (300° F.) of 40,500 cps and at 177° C. (350° F.) of 16,500 cps. The PAFT was 78° C. (172° F.) and the SAFT was 139° C. (283° F.).

What is claimed is:

1. A hot melt adhesive comprising at least 5% of a thermoplastic elastomer block copolymer selected from the group consisting of polyester-polyether, polyamide-polyester, polyamide-polyether and polyurethane block copolymer elastomers, the copolymer having a Vicat softening temperature of at least 60° C. and a melting point of at least 100° C., said hot melt adhesive being characterized by an open time after melt application to a first substrate, after which the adhesive bond rapidly strengthens so that a second substrate, joined to said first substrate during said open time, may no longer be repositioned, said open time lasting for a period of between 1 minute and 2 hours.

2. A hot melt adhesive as in claim 1 wherein said thermoplastic elastomer is a polyester-polyether polymer.

3. A hot melt adhesive as in claim 1 having a tensile strength greater than 10 MPa.

4. A hot melt adhesive as in claim 1 wherein said thermoplastic elastomer is present in an amount of 10–50% by weight and said formulation further comprises 0–40% of a plasticizer and 5–70% of a tackifier.

5. A hot melt adhesive as in claim 4 wherein the tackifier comprises a low molecular weight thermoplastic hydrocarbon tackifier resin.

6. A hot melt adhesive as in claim 5 wherein the tackifier comprises between 10 and 40% by weight of the composition of said low melt thermoplastic hydrocarbon tackifier resin and between 0 and 30% by weight of a terpenephenolic resin.

7. A hot melt adhesive as in claim 6 wherein the thermoplastic elastomer is present at a level of 25–40% by weight of the composition, and the plasticizer is present at a level of 20–40% by weight of the composition.

8. A hot melt adhesive as in claim 4 further comprising between 0.5 and 5% by weight of an antioxidant.

9. A hot melt adhesive as in claim 1 wherein said thermoplastic elastomer has a melting point of at least 140° C.

10. A hot melt adhesive as in claim 9 wherein said adhesive is flowable at a temperature of 149° C.

11. A hot melt adhesive as in claim 1 having a melt viscosity at 350° F., said melt viscosity being less than 18,000 cps.

12. A hot melt adhesive as in claim 11 wherein said open time is between 3 and 15 minutes.

13. A hot melt adhesive as in claim 12 wherein said open time is in the range of 5–10 minutes.

14. A hot melt adhesive comprising at least 5% of a thermoplastic elastomer block copolymer selected from the group consisting of polyester-polyether, polyamide-polyester, polyamide-polyether and polyurethane block copolymer elastomers, the copolymer having a Vicat softening temperature of at least 60° C. and a melting point of at least 100° C., said hot melt adhesive being having a 72 hour SAFT of at least 100° C. and being pressure sensitive.

15. A hot melt adhesive characterized by a 72 hour SAFT of at least 100° C., the adhesive comprising between 10% and 50% of a segmented thermoplastic copolymer comprising plural soft segments within the molecular weight range of 500–3000 and plural hard segments in the molecular weight range of 200–750, said copolymer having a melting point of at least 100° C. and a Vicat softening temperature of at least 60° C., said hot melt adhesive being characterized by an open time after melt application to a first substrate, after which the adhesive bond rapidly strengthens so that a second substrate, joined to said first substrate during said open time, said open time lasting for a period of between 1 minute and 2 hours.

16. A hot melt adhesive as in claim 15 wherein said copolymer soft segments comprise polyether and said copolymer hard segments comprise polyester or polyamide.

17. An article of furniture comprising an adhesively bonded assembly of parts wherein said adhesive is a hot melt as in claim 15.

18. A hot melt adhesive as in claim 15 wherein the adhesive has a peel adhesion failure temperature of at least 57° C. (135° F.).

19. A hot melt adhesive as in claim 15 wherein the copolymer has a melting point of at least 149° C. (300° F.).

20. A hot melt adhesive as in claim 15 having a melt viscosity at 350° F., said melt viscosity being less than 18,000 cps.

21. A hot melt adhesive as in claim 20 wherein said open time is between 3 and 15 minutes.

22. A hot melt adhesive as in claim 21 wherein said open time is in the range of 5–10 minutes.

23. A hot melt adhesive as in claim 21 wherein the SAFT is in the range of 116° C. to 127° C.

24. A method of bonding an article to the interior of an automobile in an automobile in an above-the-belt location comprising applying a hot melt adhesive composition which comprises at least 5% of a thermoplastic elastomer block copolymer, the copolymer having a Vicar softening temperature of at least 60° C. and a melting point of at least 100° C. in molten form to one or both of said article and said interior location and joining said article to said interior location until fixtured.

25. A method as in claim 24 wherein said thermoplastic elastomer block copolymer has a melting point of at least 149° C. and is present in said adhesive at a level of between 10% and 50% by weight, said adhesive has a SAFT of at least 100° C. and a PAFT of at least 57° C. and said adhesive is applied at an application temperature of no more than 204° C.

26. A method as in claim 24 wherein said adhesively bonded article is a headliner material and said above-the-belt location is the interior roof of the automobile.

* * * * *